United States Patent
Haw et al.

(10) Patent No.: US 8,223,448 B1
(45) Date of Patent: Jul. 17, 2012

(54) DISK DRIVE CALIBRATING PREAMP FOR SERVO SECTORS AND DATA SECTORS

(75) Inventors: Kwok Foong Haw, Shah Alam (MY); Jame Show Leiong Hii, Puchong (MY)

(73) Assignee: Western Digital Technologies, Inc., Irvine, CA (US)

( * ) Notice: Subject to any disclaimer, the term of this patent is extended or adjusted under 35 U.S.C. 154(b) by 105 days.

(21) Appl. No.: 12/765,553

(22) Filed: Apr. 22, 2010

(51) Int. Cl.
  *G11B 5/09* (2006.01)
  *G11B 21/02* (2006.01)
(52) U.S. Cl. .......................................... 360/46; 360/75
(58) Field of Classification Search .................. None
  See application file for complete search history.

(56) References Cited

U.S. PATENT DOCUMENTS

| | | | |
|---|---|---|---|
| 5,519,548 A | 5/1996 | Liepe et al. | |
| 5,760,983 A | 6/1998 | Cowen | |
| 6,111,717 A | 8/2000 | Cloke et al. | |
| 6,487,032 B1 | 11/2002 | Cloke et al. | |
| 6,707,625 B2 | 3/2004 | Leighton et al. | |
| 6,778,345 B1 | 8/2004 | Ozdemir | |
| 6,822,817 B2 | 11/2004 | Chung et al. | |
| 6,867,941 B1 | 3/2005 | Ozdemir | |
| 6,870,696 B2 | 3/2005 | Cheung et al. | |
| 7,027,243 B2 | 4/2006 | Mitchell et al. | |
| 7,027,245 B2 | 4/2006 | Mitchell et al. | |
| 7,240,250 B2 | 7/2007 | Lea et al. | |
| 7,551,384 B1 | 6/2009 | McFadyen et al. | |
| 7,564,638 B2 | 7/2009 | Posat et al. | |
| 7,760,458 B1* | 7/2010 | Trinh | 360/66 |
| 2006/0112155 A1 | 5/2006 | Earl et al. | |
| 2009/0179665 A1 | 7/2009 | Kwon et al. | |
| 2010/0157455 A1* | 6/2010 | Watanabe | 360/31 |

* cited by examiner

*Primary Examiner* — Daniell L Negron
*Assistant Examiner* — Regina N Holder (57) ABSTRACT

A disk drive is disclosed comprising a head actuated over a disk including a plurality of tracks defined by servo sectors, wherein each track comprises a plurality of data sectors. The disk drive further comprises a preamp circuit operable to amplify a read signal emanating from the head to generate a pre-amplified read signal. A first gain setting of the preamp circuit is calibrated in response to a plurality of the servo sectors, and the first gain setting is adjusted in response to a plurality of the data sectors.

16 Claims, 7 Drawing Sheets

DISK DRIVE CALIBRATING PREAMP FOR SERVO SECTORS AND DATA SECTORS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

Figure 1:
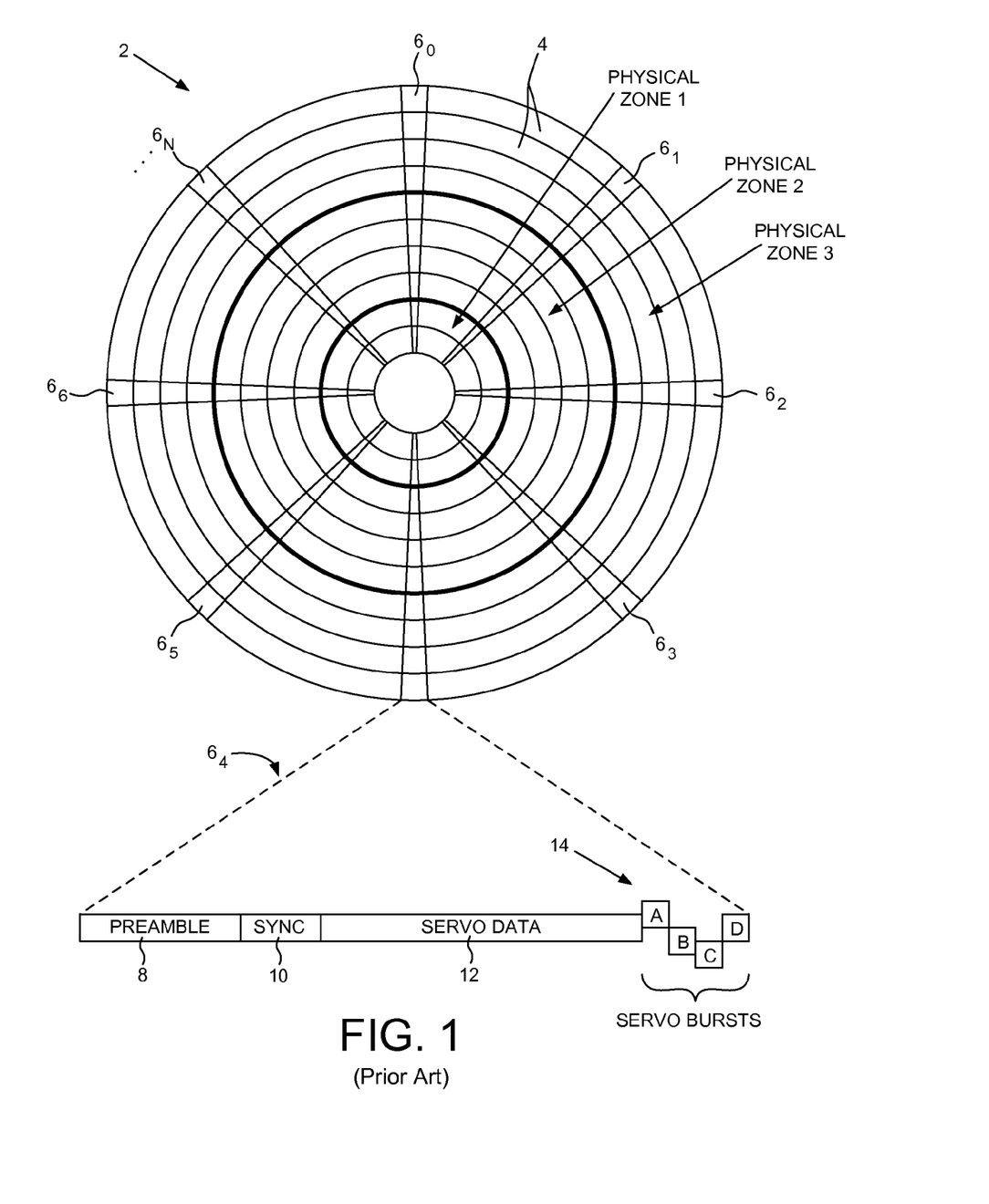
FIG. 1 shows a prior art disk format comprising a plurality of data tracks defined by a plurality of servo sectors.

The prior art disk format of FIG. 1 also comprises a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise a dynamic fly height (DFH) controller, such as a heater which controls the fly height through thermal expansion or a piezoelectric (PZT) actuator. It is desirable to determine the appropriate DFH control setting (e.g., appropriate current applied to the heater or PZT actuator) that achieves the target fly height for each head.

A disk drive also typically comprises a preamp circuit for amplifying the read signal emanating from the head. The pre-amplified read signal is further amplified by a variable gain amplifier (VGA) which continuously adjusts the amplitude of the read signal toward a target response (e.g., a target partial response). It is desirable to calibrate the gain of the preamp circuit relative to the amplitude of read signal in order to optimize operation of the VGA (e.g., minimize signal noise amplification as well as prevent amplitude saturation).

DETAILED DESCRIPTION OF EMBODIMENTS OF THE INVENTION

Figure 2A:
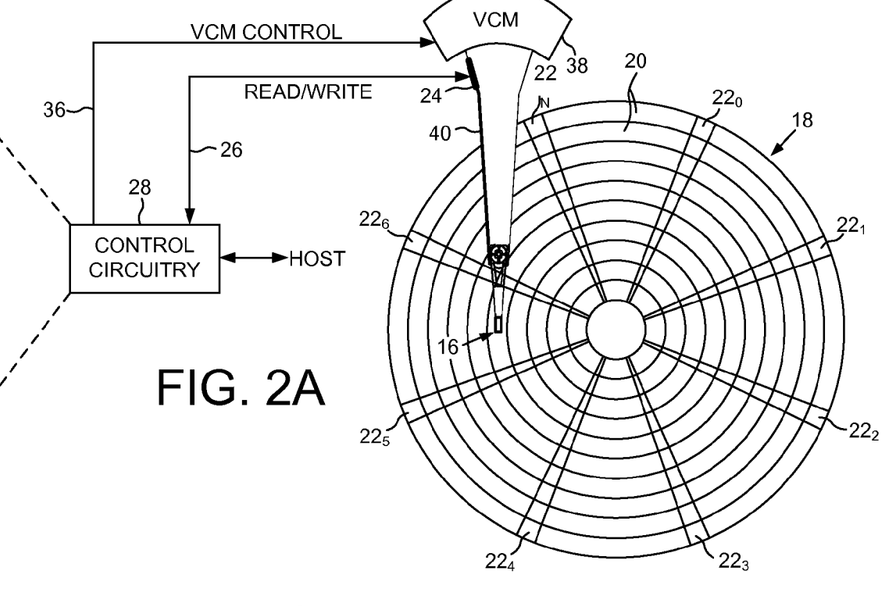
FIG. 2A shows a disk drive according to an embodiment of the present invention comprising a head actuated over a disk, a preamp circuit, and control circuitry.
Figure 2B:
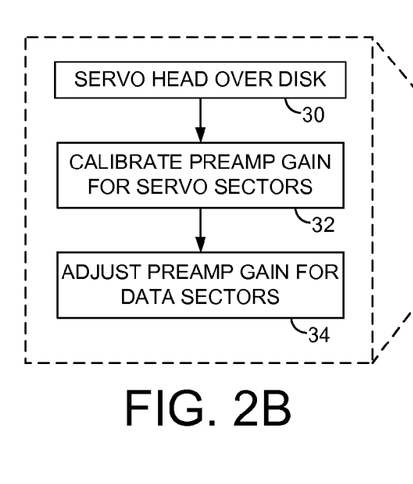
FIG. 2B is a flow diagram according to an embodiment of the present invention executed by the control circuitry for calibrating a gain of the preamp circuit.

FIG. 2A shows a disk drive according to an embodiment of the present invention comprising a head 16 actuated over a disk 18 including a plurality of tracks 20 defined by servo sectors $22_0$-$22_N$, wherein each track 20 comprises a plurality of data sectors. The disk drive further comprises a preamp circuit 24 operable to amplify a read signal emanating from the head 16 to generate a pre-amplified read signal 26. The disk drive further comprises control circuitry 28 operable to execute the flow diagram shown in FIG. 2B. As the head is servoed over one of the tracks (step 30) a first gain setting of the preamp circuit is calibrated in response to a plurality of the servo sectors (step 32). The first gain setting is then adjusted in response to a plurality of the data sectors (step 34).

In the embodiment of FIG. 2A, the control circuitry 28 processes the pre-amplified read signal 26 emanating from the preamp circuit 24 to demodulate the embedded servo sectors $22_0$-$22_N$ and generate a position error signal (PES) representing a radial offset of the head 16 from a target track 20. The control circuitry 28 processes the PES with a suitable servo compensator to generate a control signal 36 applied to a voice coil motor (VCM) 38. The VCM 38 rotates an actuator arm 40 about a pivot in order to actuate the head 16 radially over the disk 18 in a direction that decreases the PES. In the embodiment of FIG. 2A, the servo sectors $22_0$-$22_N$ are concentric and define concentric data tracks 20. However, any suitable disk format may be employed in the embodiments of the present invention, such as servo sectors that define spiral data tracks, and/or servo sectors that define spiral servo tracks.

Figure 2C:
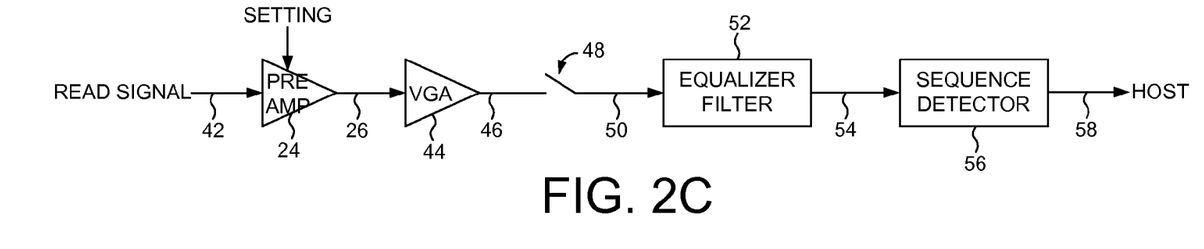
FIG. 2C shows control circuitry according to an embodiment of the present invention comprising the preamp circuit, a variable gain amplifier (VGA), an equalizer, and a sequence detector.

FIG. 2C shows control circuitry according to an embodiment of the present invention wherein a read signal 42 emanating from the head 16 is amplified by the preamp circuit 24 to generate a pre-amplified read signal 26. In the embodiment of FIG. 2C, the preamp circuit 24 is implemented within an integrated circuit mounted to the actuator arm 40 and connected through a flex circuit to the control circuitry 28 mounted on a printed circuit board. To minimize the size of the flex circuit as well as the pin-out of the preamp circuit 24, a serial communication protocol may be employed to program the preamp circuit 24.

Referring again to FIG. 2C, the control circuitry 28 comprises a read channel circuit including a variable gain amplifier (VGA) 44 that further amplifies the pre-amplified read signal 26 to generate an amplified read signal 46 according to a target response (e.g., a target partial response such as PR4, EPR4, etc.). The amplified read signal 46 is sampled by a sampling device 48 to generate discrete-time read signal samples 50. An equalizer filter 52 equalizes the read signal samples 50 according to the target response to generate equalized samples 54. A sequence detector 56 (e.g., a Viterbi detector or iterative detector) processes the equalized samples 54 to generate a data sequence 58 transmitted to the host. In one embodiment, the control circuitry 28 comprises error correction code (ECC) circuitry (not shown) for detecting and correcting errors in the data sequence 58 prior to transmission to the host.

Figure 3:
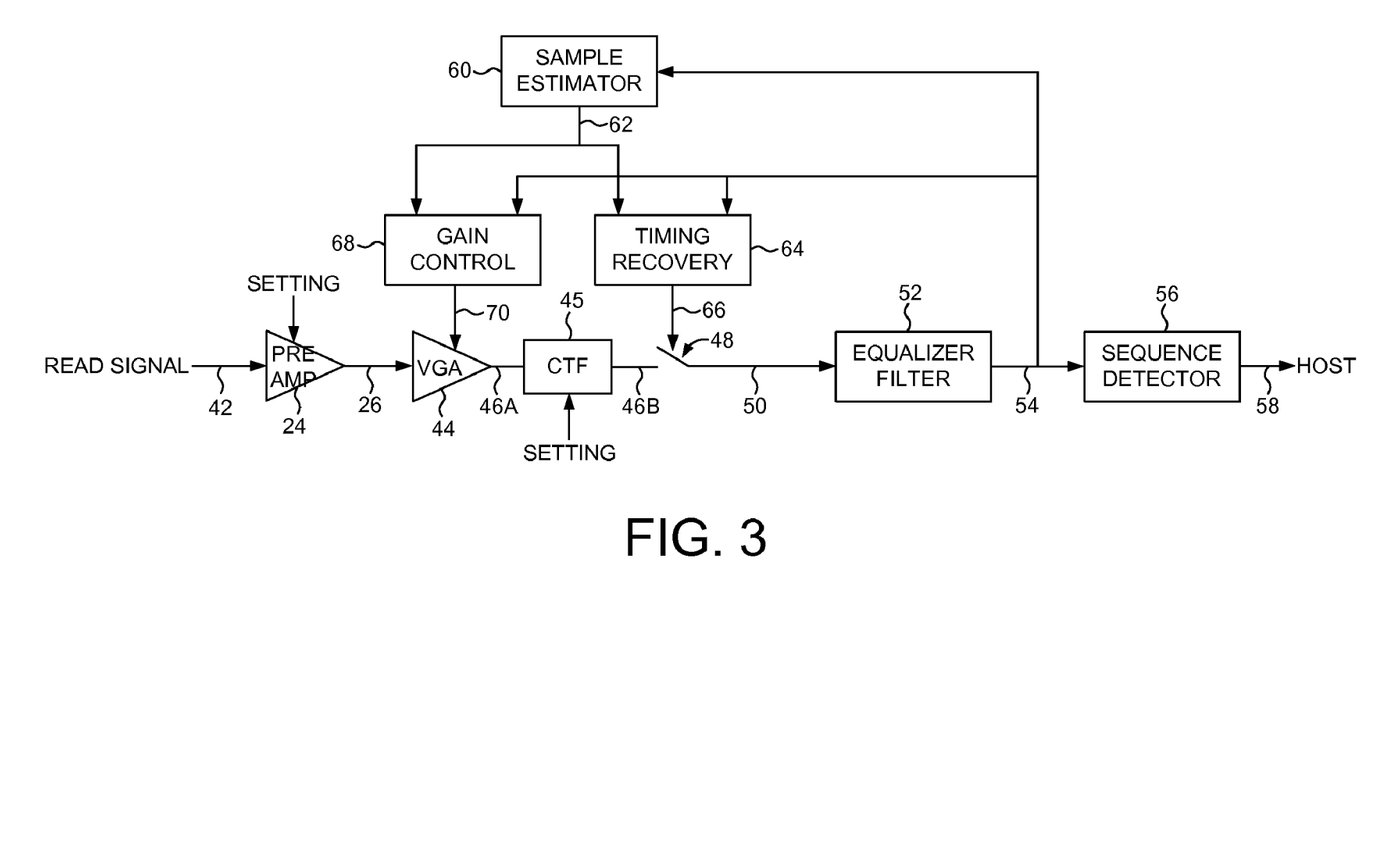
FIG. 3 shows control circuitry according to an embodiment of the present invention comprising a gain control loop and a timing recovery loop.

FIG. 3 shows control circuitry according to an embodiment of the present invention further comprising a cut-off filter (CTF) 45 which shapes the amplified read signal 46A by providing suitable bandwidth and gain to generate a filtered read signal 46B. Also in the embodiment of FIG. 3, a sample estimator 60 (e.g., a slicer) estimates a target sample value 62 from an equalized sample value 54. The target sample value 62 and equalized sample value 54 are processed by timing recovery 64 to synchronize a sampling clock 66 to the baud rate of the data, and processed by gain control 68 to generate a VGA gain setting 70 for adjusting the gain of the VGA 44. Other embodiments may employ interpolated timing recovery wherein synchronous read signal samples are generated by interpolating asynchronous read signal samples.

At least some of the components in the embodiment of FIG. 3 may be programmed with suitable values depending on whether the head is reading the servo sectors or the data sectors. For example, coefficients in the CTF 45 and equalizer filter 52 as well as coefficients in the gain control loop and timing recovery loop may be programmed with suitable values for servo sectors and data sectors. In another embodiment, the programmable values may be calibrated over different radial locations of the disk, such as in the different zones shown in FIG. 1. In one embodiment, the preamp circuit 24 is programmed with a gain setting that may be used for both the servo sectors and the data sectors. Accordingly, in this embodiment the gain setting for the preamp circuit 24 is calibrated first for the servo sectors, and then adjusted for the data sectors to select a preamp gain setting that operates suitably for both the servo sectors and data sectors.

Figure 4A:
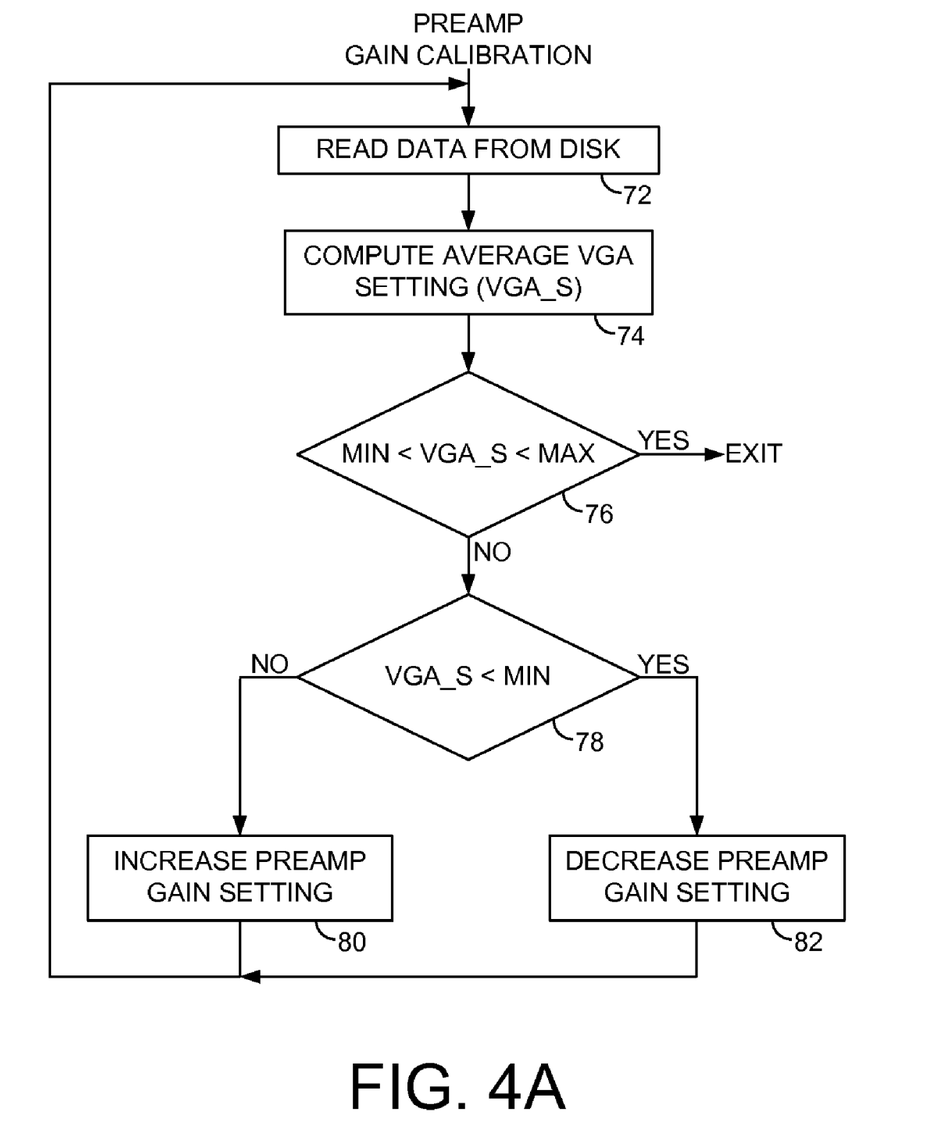
FIG. 4A is a flow diagram according to an embodiment of the present invention wherein the gain setting of the preamp circuit is adjusted until the gain setting of the VGA falls within a predetermined range.

FIG. 4A is a flow diagram according to an embodiment of the present invention for calibrating the gain setting of the preamp circuit 24. Data is read from the disk (step 72) and an average VGA setting (VGA_S) is computed (step 74). If the average VGA_S exceeds a predetermined range (step 76), then if the average VGA_S is less than a minimum threshold (step 78) the gain setting for the preamp circuit is increased (step 80), otherwise the gain setting for the preamp circuit is decreased (step 82). The flow diagram is then repeated starting at step 72 until the average VGA_S falls within the predetermined range (step 76). In one embodiment, the goal of the calibration procedure is to adjust the gain setting of the preamp circuit 24 to better match the range of the VGA 44.

Figure 4B:
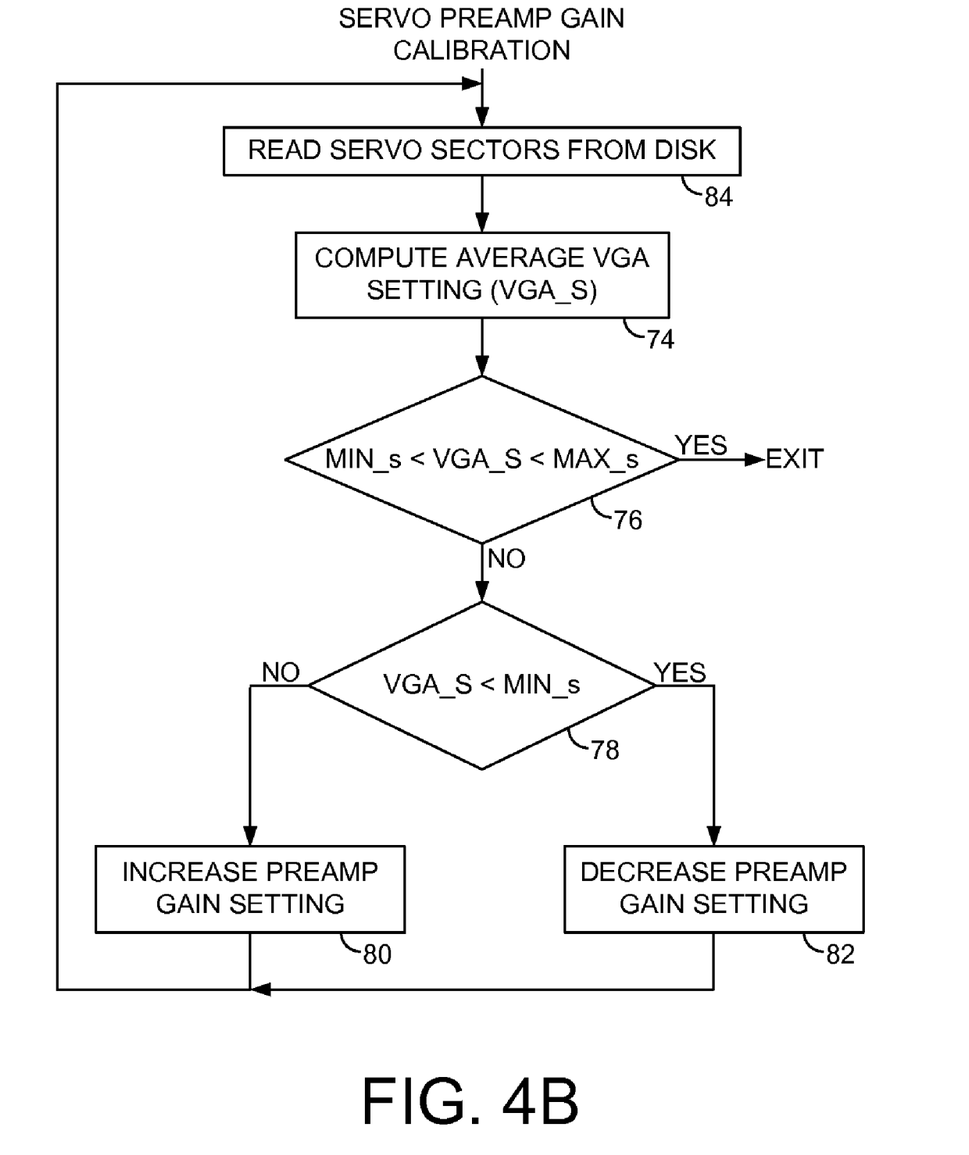
FIG. 4B is a flow diagram according to an embodiment of the present invention wherein the servo sectors are read in order to calibrate a first gain setting of the preamp circuit.

FIG. 4B is a flow diagram according to an embodiment of the present invention wherein the data read from the disk (step 84) comprises the servo sectors $22_0$-$22_N$ (e.g., the preamble 8, sync mark 10, servo data 12, and servo bursts 14 of FIG. 1). The predetermined range for checking the average VGA_S comprises minimum servo threshold (MIN_s) and a maximum servo threshold (MAX_s) that are selected for the servo sectors.

Figure 4C:
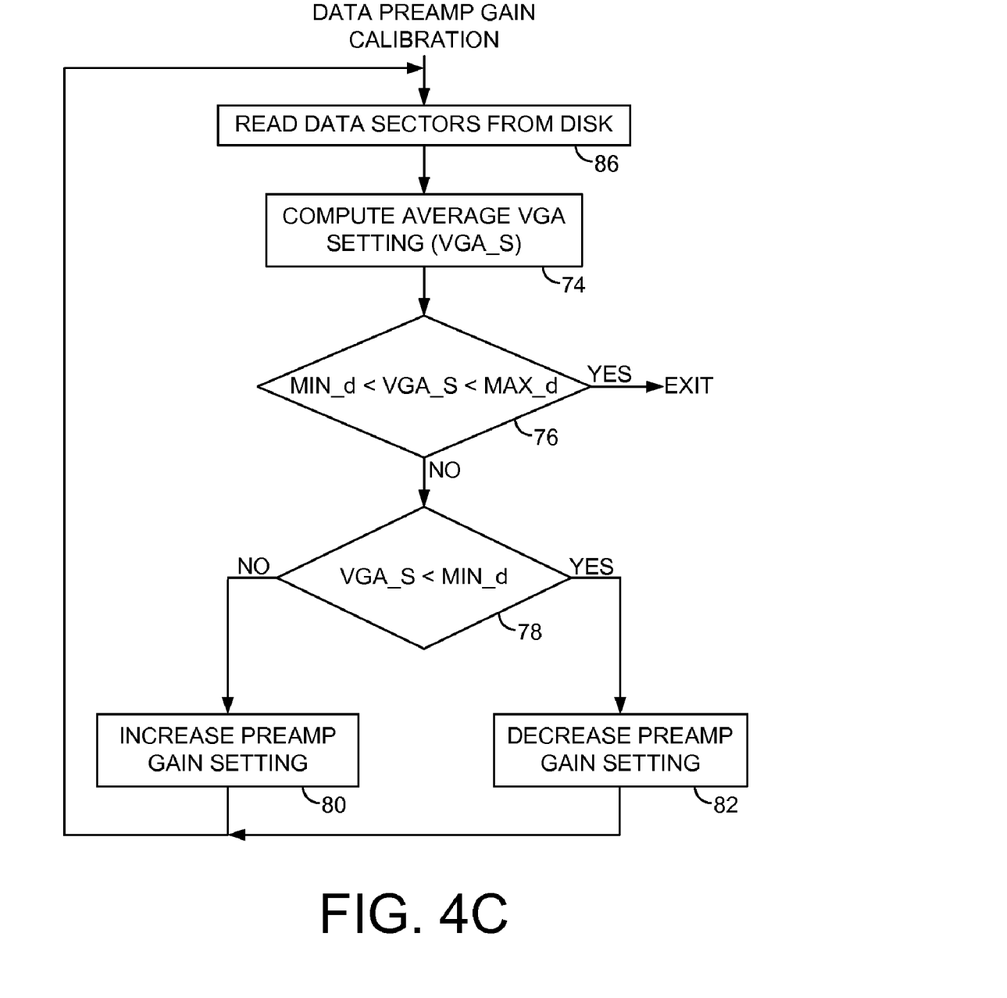
FIG. 4C is a flow diagram according to an embodiment of the present invention wherein the data sectors are read in order to adjust the first gain setting of the preamp circuit.

FIG. 4C is a flow diagram according to an embodiment of the present invention wherein the data read from the disk (step 86) comprises the data sectors of a data track 20. The predetermined range for checking the average VGA_S (step 76) comprises a minimum data threshold (MIN_d) and a maximum data threshold (MAX_d) that are selected for the data sectors.

Figure 5:
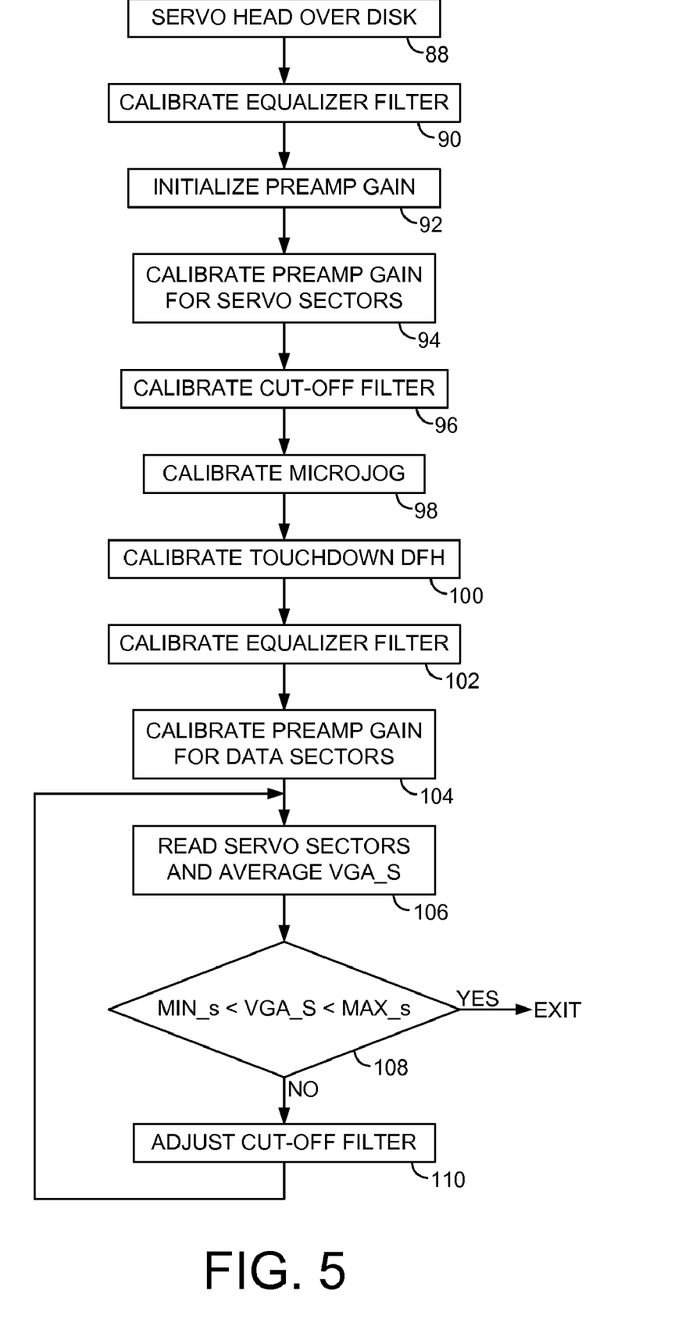
FIG. 5 is a flow diagram according to an embodiment of the present invention wherein after adjusting the gain setting of the preamp circuit a cut-off filter is adjusted if the VGA setting falls outside a range when reading the servo sectors.

FIG. 5 is a flow diagram according to an embodiment of the present invention wherein the head is servoed over one of the data tracks on the disk (step 88). The equalizer filter is calibrated (step 90), for example, to determine coefficients that equalize the read signal samples toward the desired target response. A gain setting is initialized for the preamp circuit (step 92), for example, to a nominal value determined for a family of disk drives. A first gain setting for the preamp circuit is then calibrated for the servo sectors by executing the flow diagram of FIG. 4B (step 94). After calibrating the first gain setting for the preamp circuit, the cut-off filter is calibrated (step 96), for example, with a suitable gain and bandwidth. A microjog value is then calibrated (step 98) wherein the microjog accounts for a radial offset between a read element and a write element in the head. After calibrating the microjog value, a touchdown dynamic fly height (DFH) control setting is calibrated (step 100), wherein a DFH controller controls a fly height of the head using a suitable actuator (e.g., a heater or piezoelectric element). Touchdown refers to a fly height control setting that causes the head to contact the disk surface. In one embodiment, an operating fly height is selected relative to the touchdown DFH setting, for example, by backing off the DFH setting by a predetermined offset from the touchdown setting.

After calibrating the touchdown DFH setting, the equalizer filter is recalibrated to adjust the coefficients toward values that better equalize the read signal samples toward the desired target response (step 102). The first gain setting for the preamp circuit is then adjusted for the data sectors by executing the flow diagram of FIG. 4C (step 104). After adjusting the gain setting for the preamp circuit, a plurality of the servo sectors are read in order to generate an average VGA_S (step 106). If the average VGA_S exceeds a predetermined range (step 108), the cut-off filter (FIG. 3) is adjusted, for example, by adjusting at least one of a gain and bandwidth of the cut-off filter (step 110). This process of reading the servo sectors is repeated until the average VGA_S falls within the predetermined range (step 108).

Figure 4D:
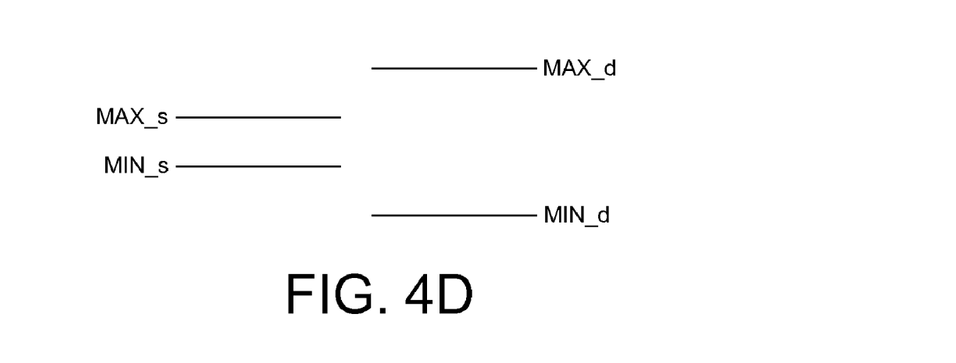
FIG. 4D shows an embodiment of the present invention wherein the range for calibrating the gain setting for the preamp circuit when reading the data sectors is wider than the range used when reading the servo sectors.

FIG. 4D illustrates an embodiment of the present invention wherein the range (MIN_d to MAX_d) used when calibrating the gain setting of the preamp circuit for the data sectors (step 76 of FIG. 4C) is wider than the range (MIN_s to MAX_s) used when calibrating the gain setting of the preamp circuit for the servo sectors (step 76 of FIG. 4B). In addition, the range used when calibrating the gain setting of the preamp circuit for the servo sectors at step 94 of FIG. 5 may be the same or different than the range used at step 108 of FIG. 5.

In one embodiment, the above procedure for calibrating the gain setting of the preamp circuit may be executed at a number of different radial locations of the disk (e.g., in each physical zone of FIG. 1). During normal operation as the head enters each zone, the control circuitry may program the preamp circuit with the corresponding gain setting prior to performing read operations.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk comprising a plurality of tracks defined by servo sectors, wherein each track comprises a plurality of data sectors;
 a head actuated over the disk;
 a preamp circuit operable to amplify a read signal emanating from the head to generate a pre-amplified read signal; and
 control circuitry comprising a variable gain amplifier (VGA) operable to amplify the pre-amplified read signal to generate an amplified read signal, the control circuitry operable to:
  calibrate a first gain setting of the preamp circuit in response to a plurality of the servo sectors;
  adjust the first gain setting in response to a plurality of the data sectors;
  adjust a second gain setting of the VGA in order to adjust an amplitude of the amplified read signal based on a target response;
  calibrate the first gain setting of the preamp circuit in response to the second gain setting;
 wherein:
  the control circuitry is operable to calibrate the first gain setting in response to the servo sectors by:
   increasing the first gain setting when the second gain setting is greater than a servo maximum threshold; and
   decreasing the first gain setting when the second gain setting is less than a servo minimum threshold,
  the control circuitry is operable to adjust the first gain setting in response to the data sectors by:
   increasing the first gain setting when the second gain setting is greater than a data maximum threshold; and
   decreasing the first gain setting when the second gain setting is less than a data minimum threshold; and
   a range defined by the data maximum threshold and the data minimum threshold is wider than a range defined by the servo maximum threshold and the servo minimum threshold.

2. The disk drive as recited in claim 1, wherein the control circuitry further comprises a cut-off filter for filtering the amplified read signal output by the VGA when reading the servo sectors, and after adjusting the first gain setting in response to the data sectors, the control circuitry is operable to adjust the cut-off filter when the second gain setting while reading the servo sectors is outside a range.

3. The disk drive as recited in claim 2, wherein the control circuitry is operable to adjust at least one of a bandwidth and gain of the cut-off filter when the second gain setting is outside the range.

4. The disk drive as recited in claim 1, wherein prior to adjusting the first gain setting in response to the data sectors, the control circuitry is operable to adjust a fly height of the head.

5. The disk drive as recited in claim 4, wherein the control circuitry is operable to adjust the fly height of the head by:
 adjusting a fly height control signal until the head contacts the disk; and
 selecting an operating fly height in response to the head contacting the disk.

6. A method of operating a disk drive comprising a disk including a plurality of tracks defined by servo sectors, wherein each track comprises a plurality of data sectors, a head actuated over the disk, a preamp circuit operable to amplify a read signal emanating from the head to generate a pre-amplified read signal, and a variable gain amplifier (VGA) operable to amplify the pre-amplified read signal to generate an amplified read signal, the method comprising:
 calibrating a first gain setting of the preamp circuit in response to a plurality of the servo sectors;
 adjusting the first gain setting in response to a plurality of the data sectors;
 adjusting a second gain setting of the VGA in order to adjust an amplitude of the amplified read signal based on a target response; and
 calibrating the first gain setting of the preamp circuit in response to the second gain setting,
 wherein:
  calibrating the first gain setting in response to the servo sectors comprises:
   increasing the first gain setting when the second gain setting is greater than a servo maximum threshold; and
   decreasing the first gain setting when the second gain setting is less than a servo minimum threshold;
  adjusting the first gain setting in response to the data sectors comprises:
   increasing the first gain setting when the second gain setting is greater than a data maximum threshold; and
   decreasing the first gain setting when the second gain setting is less than a data minimum threshold; and
  a range defined by the data maximum threshold and the data minimum threshold is wider than a range defined by the servo maximum threshold and the servo minimum threshold.

7. The method as recited in claim 6, wherein the disk drive further comprises a cut-off filter for filtering the amplified read signal output by the VGA when reading the servo sectors, and after adjusting the first gain setting in response to the data sectors, the method further comprising adjusting the cut-off filter when the second gain setting while reading the servo sectors is outside a range.

8. The method as recited in claim 7, further comprising adjusting at least one of a bandwidth and gain of the cut-off filter when the second gain setting is outside the range.

9. The method as recited in claim 6, wherein prior to adjusting the first gain setting in response to the data sectors, further comprising adjusting a fly height of the head.

10. The method as recited in claim 9, wherein adjusting the fly height of the head comprises:
adjusting a fly height control signal until the head contacts the disk; and
selecting an operating fly height in response to the head contacting the disk.

11. A disk drive comprising:
a disk comprising a plurality of tracks defined by servo sectors, wherein each track comprises a plurality of data sectors;
a head actuated over the disk;
a preamp circuit operable to amplify a read signal emanating from the head to generate a pre-amplified read signal; and
control circuitry comprising a variable gain amplifier (VGA) operable to amplify the pre-amplified read signal to generate an amplified read signal, and a cut-off filter for filtering the amplified read signal output by the VGA when reading the servo sectors, the control circuitry operable to:
calibrate a first gain setting of the preamp circuit in response to a plurality of the servo sectors;
adjust the first gain setting in response to a plurality of the data sectors;
adjust a second gain setting of the VGA in order to adjust an amplitude of the amplified read signal based on a target response; and
after adjusting the first gain setting in response to the data sectors, adjust the cut-off filter when the second gain setting while reading the servo sectors is outside a range.

12. A method of operating a disk drive, the disk drive comprising a disk comprising a plurality of tracks defined by servo sectors, wherein each track comprises a plurality of data sectors, a head actuated over the disk, a preamp circuit operable to amplify a read signal emanating from the head to generate a pre-amplified read signal, and control circuitry comprising a variable gain amplifier (VGA) operable to amplify the pre-amplified read signal to generate an amplified read signal, and a cut-off filter for filtering the amplified read signal output by the VGA when reading the servo sectors, the method comprising:
calibrating a first gain setting of the preamp circuit in response to a plurality of the servo sectors;
adjusting the first gain setting in response to a plurality of the data sectors;
adjust a second gain setting of the VGA in order to adjust an amplitude of the amplified read signal based on a target response; and
after adjusting the first gain setting in response to the data sectors, adjusting the cut-off filter when the second gain setting while reading the servo sectors is outside a range.

13. A disk drive comprising:
a disk comprising a plurality of tracks defined by servo sectors, wherein each track comprises a plurality of data sectors;
a head actuated over the disk;
a preamp circuit operable to amplify a read signal emanating from the head to generate a pre-amplified read signal; and
control circuitry operable to:
calibrate a first gain setting of the preamp circuit in response to a plurality of the servo sectors; and
adjust the first gain setting in response to a plurality of the data sectors;
wherein prior to adjusting the first gain setting in response to the data sectors, the control circuitry is operable to adjust a fly height of the head.

14. The disk drive as recited in claim 13, wherein the control circuitry is operable to adjust the fly height of the head by:
adjusting a fly height control signal until the head contacts the disk; and
selecting an operating fly height in response to the head contacting the disk.

15. A method of operating a disk drive comprising a disk including a plurality of tracks defined by servo sectors, wherein each track comprises a plurality of data sectors, a head actuated over the disk, and a preamp circuit operable to amplify a read signal emanating from the head to generate a pre-amplified read signal, the method comprising:
calibrating a first gain setting of the preamp circuit in response to a plurality of the servo sectors; and
adjusting the first gain setting in response to a plurality of the data sectors;
wherein prior to adjusting the first gain setting in response to the data sectors, further comprising adjusting a fly height of the head.

16. The method as recited in claim 15, wherein adjusting the fly height of the head comprises:
adjusting a fly height control signal until the head contacts the disk; and
selecting an operating fly height in response to the head contacting the disk.

* * * * *